May 13, 1958 W. F. STEAGALL 2,834,894

ASYMMETRICALLY ENERGIZED MAGNETIC AMPLIFIERS

Filed June 5, 1956

INVENTOR.
WILLIAM F. STEAGALL

BY

[signature]

AGENT 2,834,894
Patented May 13, 1958

2,834,894

ASYMMETRICALLY ENERGIZED MAGNETIC AMPLIFIERS

William F. Steagall, Merchantville, N. J., assignor to Sperry Rand Corporation, New York, N. Y., a corporation of Delaware Application June 5, 1956, Serial No. 589,426

27 Claims. (Cl. 307—88)

The present invention relates to magnetic amplifiers, particularly of the pulse type; and is primarily concerned with magnetic amplifiers employing asymmetrical alternating energization sources whereby improved operation of such amplifiers is effected.

Reference is made to my prior Patent No. 2,709,798, issued May 31, 1955, for: "Bistable Devices Utilizing Magnetic Amplifiers." The said prior patent describes, inter alia, magnetic amplifiers of both the complementing and non-complementing types, wherein energization for the said amplifiers takes the form of an alternating pulse source. It will be appreciated that amplifiers such as have been described in the said Patent No. 2,709,798 and such as will be described hereinafter, ordinarily comprise a core of magnetic material preferably, but not necessarily, exhibiting a substantially rectangular hysteresis loop. The said core has an input winding which may be energized selectively by a source of input pulses, and the said core further carries a power or output winding which is energized by an alternating power or clock pulse source having a square wave, sine wave or other alternating wave configuration. In the past, these alternating power or clock pulse sources have produced symmetrical energizing pulses having an average potential level equal to the amplifier output reference level, and such energization of magnetic amplifiers has in turn been found to result in improper amplifier operation, or in reduced amplifier gain, due primarily to the fact that under various operating conditions of the amplifier, the amplifier core may be required to switch through a greater portion of the hysteresis loop thereof, or may be required to switch through a given portion of the core hysteresis loop in a shorter time, than is the case under other operating conditions which may be encountered.

The present invention, recognizing these operational characteristics of magnetic amplifiers, achieves considerably improved amplifier operation primarily through the use of power or clock pulses having a non-zero average value with respect to the magnetic amplifier output pulse reference level. In particular, the polarity of the average value of the power or clock pulse source is selected to be opposite to the normal polarity of the amplifier output pulse, and speaking loosely with respect to one form of the invention, one may say that the power pulse exhibits a larger negative-going than positive-going excursion.

The purpose of this arrangement will become clear if we should consider a typical output pulse from a magnetic amplifier, for instance of the type described in my said prior Patent No. 2,709,798. As may be demonstrated mathematically, and in practice, the leading edge of such an output pulse will be delayed in time with respect to the leading edge of the power or clock pulse from which it is derived, due to the $B_r$-$B_s$ ratio of the amplifier core material and due to inductance in the interconnecting leads. This means that a shorter time is available for flipping the core by means of an input pulse (e. g. applied to the amplifier input winding) than is available for flipping the core by means of a clock pulse (e. g. applied to the amplifier power winding). If the total flux change due to core flipping by the two methods, i. e. by an input pulse and by a clock pulse, is the same, then the voltage induced in the amplifier output winding, when the core is flipped in the said shorter time by an input pulse, will be greater than the clock or power voltage required to flip the core in a reverse direction.

The total flux change produced by the amplifier power pulse must, of course, be no greater than twice the remanent value since, if a greater flux change is produced, an undesirable sneak pulse will occur at the end of the flipping time when the amplifier core approaches saturation. On the other hand, the input signal in a complementer or the reverting current in a non-complementer must, under some conditions of operation, e. g. subsequent to an amplifier output, drive the core from the region of positive saturation to negative remanence, as is described in my prior patent. Thus, the flux change which must be produced by the input signal or by the reverting current necessarily exceeds the flux change which must be produced by the power pulse by the difference between saturation and remanence fluxes.

Recognizing these amplifier characteristics, it will now be appreciated that there are two operational cases to be considered. In the case of a non-complementing circuit (see Figure 4 of my prior patent) which has just produced an output, the bias or reverting current must produce a larger flux change than is required of the power pulse and must produce this change in the same time allowed for flipping by the power pulse. Necessarily, there must then be a higher rate of change of flux, and the bias current will produce a larger voltage across the output winding than does the power pulse. In the case of a complementer (see Figure 2 of my prior patent), the reduced duration of the input signal discussed above results in a larger voltage across the output winding because of the reduced time available for flipping, with a consequently higher rate of change of flux in the amplifier core. In addition, in this latter complementer case, the input signal is required to drive the amplifier core from a region of positive saturation to negative remanence and, as mentioned previously, the power pulse may produce only a smaller flux change equal to twice the remanent flux. If the input or bias circuits are loaded by the output winding due to induced voltages in the output winding causing conduction of the power diode, then proper reversion of the core will be adversely affected. The present invention prevents the output winding from loading the bias circuit or the input circuit, as the case may be, by making one polarity excursion of the power waveform effectively greater than the other polarity excursion thereof.

It is accordingly an object of the present invention to provide improved magnetic amplifiers.

Another object of the present invention resides in the provision of magnetic amplifier circuits having improved power gain.

A still further object of the present invention resides in the provision of pulse type magnetic amplifiers energized by asymmetrical pulse sources whereby said amplifiers have increased power gain.

Another object of the present invention resides in the provision of improved amplifier circuits wherein the average level of an alternating energizing source for the said amplifier is different from the reference level of output pulses produced by the said amplifier whereby operation of the said amplifier circuits is more reliable, efficient, and otherwise improved.

Still another object of the present invention resides in the provision of both complementing and non-complementing amplifier circuits exhibiting improved operation.

A still further object of the present invention resides in the provision of novel energization sources capable of use with magnetic amplifiers of both the pulse and carrier types, which energization sources effect improved operation in each of the said amplifier types.

In providing for the foregoing objects and advantages, and as has been already discussed, the present invention contemplates the provision of improved magnetic amplifier circuits energized by an effectively asymmetrical alternating source, i. e. an energization source having its average potential level displaced from the reference level of the amplifier output. The said source waveform may take a number of alternative configurations, and the effective displacement of the source waveform relative to the amplifier output reference level may in fact be either in a positive or negative direction depending upon the particular polarities of rectifiers and windings associated with the magnetic core comprising the amplifier. In the subsequent description, pulse type amplifiers of both the complementing and non-complementing type will be described, and the energization sources to be discussed take the form of rectangular waves having an average value which is effectively negative with respect to the amplifier output reference level (i. e. ground). It will be appreciated, however, that the present invention is not limited to the precise amplifier configurations shown, to the particular wave configuration to be described, or to the particular polarity of the average value of the source relative to the output reference level, and modifications in each of these respects may be effected by those skilled in the art.

The foregoing objects, advantages, construction and operation of the present invention will become more readily apparent from the following description and accompanying drawings, in which.

Figure 1:
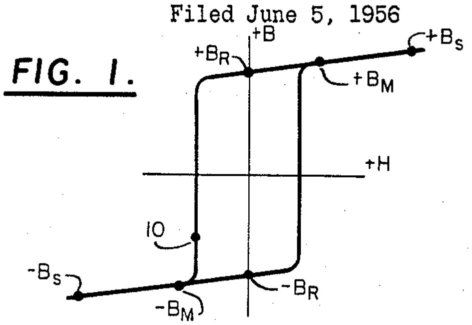
Figure 1 is an idealized hysteresis loop of a magnetic material which may preferably but not necessarily be employed in the cores of my improved magnetic amplifiers.
Figure 2:
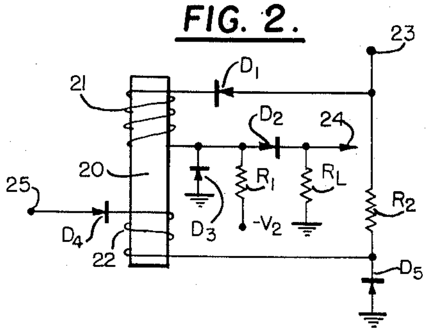
Figure 2 is a schematic representation of an improved pulse type complementing magnetic amplifier in accordance with the present invention.
Figure 3:
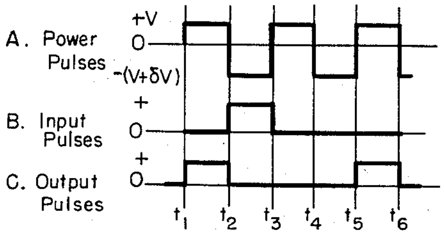
Figure 3 (A through C) are waveforms illustrating the operation of the complementing amplifier shown in Figure 2.

Referring now to Figures 1 through 3, it will be seen that a complementing magnetic amplifier in accordance with the present invention may comprise a core 20 utilizing a magnetic material exhibiting a substantially rectangular hysteresis loop of the type illustrated in Figure 1. The core 20 may take a number of configurations, and the hysteretic characteristic of the said core may similarly assume a number of forms, not limited to rectangularity. In this respect, attention is invited to my Patent No. 2,709,798 for possible variations in the core configurations and hysteretic characteristic thereof, and it will be understood that these variations apply with equal force to the several embodiments of the present invention.

Core 20 carries a power or output winding 21 and a signal or input winding 22 thereon. One end of the said power winding 21 is coupled via a rectifier D1 to a terminal 23, to which terminal is fed a train of asymmetrical positive and negative-going power pulses (Figure 3A). For the particular winding directions and rectifier polarities shown in Figure 2 (and for that matter in Figure 4), the power pulses appearing at terminal 23 (or 43 to be discussed in reference to Figure 4), are assumed to exhibit a greater negative-going than positive-going amplitude, whereby the said power pulses have a negative average value. It will be appreciated, however, that by alteration in the winding directions and in the rectifier polarities, selective outputs of a polarity opposite to that which will be described may be obtained, and in such an event, the average value of the asymmetrical power pulse should be positive rather than negative.

The lower end of output winding 21 is coupled via a rectifier D2 to an output terminal 24, whereby outputs selectively appear across a load $R_L$, and the said power winding 21 is also associated with a sneak suppressor or clamp circuit comprising elements D3 and R1, operating in the manner already described in my above identified prior patent, to clamp the amplifier output at a reference potential of ground under no-output conditions of operation. The upper end of input winding 22 is coupled to an input terminal 25 via a rectifier D4, and the lower end of the said winding 22 is coupled to the junction of a resistor R2 and a rectifier D5, functioning again in the manner described in my prior patent.

The magnetic amplifier circuit shown in Figure 2 acts as a complementer in that outputs appear at terminal 24 in the absence of inputs at terminal 25, while application of an input to terminal 25 inhibits further outputs at the said terminal 24. In operation, if we should assume that the core 20 is at positive remanence (+B*r*), as shown in Figure 1, application of a positive-going power pulse during the time interval *t*1 to *t*2 (Figure 3) effects current flow from terminal 23 via rectifier D1 and thence via winding 21, whereby the core 20 is driven from +B*r* to +B*s*. During such operation, there is relatively little flux change in the core 20 whereby winding 21 exhibits a relatively low impedance, and slightly delayed unidirectional pulse outputs therefore appear at terminal 24 in response to each positive-going power pulse applied to terminal 23. If now an input pulse should be applied to terminal 25, during a time interval *t*2 to *t*3 the application of such an input pulse effects a switching of the core from a region of positive saturation (+B*s*), to the beginning of the negative saturation region (—B*m*); and during this switching of the core the rectifier D1 is disconnected by the negative-going portion of the power pulse at terminal 23 A next subsequent positive-going power pulse occurring for instance during the time interval *t*3 to *t*4, switches the core from the beginning of the negative saturation region —B*m* to the beginning of the positive saturation region +B*m*; and, as has been described in my above identified prior patent, this latter core switching effects a relatively large flux change in the core 20 whereby winding 21 presents a high impedance to positive-going pulses appearing at terminal 23.

It will be appreciated from the above discussion, that in the absence of input pulses the core 20 is regularly driven from +B*r* to +B*s*; and that an input pulse appearing at terminal 25 subsequent to an output from the amplifier must revert the core from +B*s* to —B*m*. Subsequent to such a reversion, the core is again switched from —B*m* to +B*m*. Thus, in the case of a complementing type magnetic amplifier, a larger traverse of the core hysteresis loop must be effected immediately subsequent to an output pulse and in response to an input pulse, than is the case when the core is switching in the absence of a prior output pulse. Moreover, it will be appreciated from the foregoing discussion that, due to the inherent time delay between application of a power pulse and production of a corresponding output pulse, an input pulse must accomplish its flipping function in a shorter time than is the case for flipping by power pulses. If the power pulses appearing at terminal 23 were to be so chosen that their average level is the same as the amplifier output reference level, and if the magnitude of these power pulses should also be chosen so as to switch the core from —B*m* to +B*m*, then the negative-going half of each such symmetrical power pulse would be of insufficient magnitude to prevent partial conduction of rectifier D1, whereby output winding 21 would load the amplifier input circuit during attempted reversion. Such symmetrical energization would therefore permit the core to be reverted only to the point 10 (see Figure 1) subsequent to an output, and this incomplete or improper reversion of the core to the operating point 10 would in turn cause the next subsequent positive-going power pulse to drive the core 26 beyond point +B*m* into the positive saturation region whereby an output would occur from the amplifier, though no such output should occur logically.

To overcome this undesirable result and to assure that complete and proper reversion of the core occurs under all operating conditions of the amplifier, the power pulses applied to terminal 23 are chosen to be asymmetrical (Figure 3A) and exhibit a positive-going amplitude +V and a negative-going amplitude $-(V+\delta V)$. This use of an asymmetrical energization source has been found to preclude spurious outputs by assuring that rectifier D1 remains cut off during core reversion whereby the input circuit can effect complete core reversion, and the use of such an asymmetrical source in fact increases the gain of the overall amplifier circuit.

Figure 4:
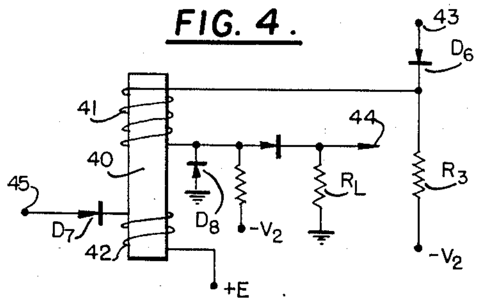
Figure 4 is a schematic representation of an improved non-complementing magnetic amplifier in accordance with the present invention.
Figure 5:
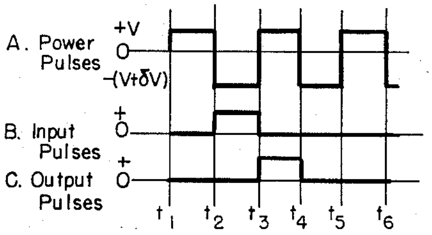
Figure 5 (A through C) are waveforms illustrating the operation of the non-complementing amplifier shown in Figure 4.

Similar advantageous results are achieved in the case of non-complementing magnetic amplifiers of the type shown in Figure 4. Such amplifiers may comprise a core 40 having a power or output winding 41 and a signal or input winding 42 thereon. The said power or output winding 41 may be coupled to a source 43 of asymmetrical power pulses (Figure 5A) via a rectifier D6, and the said signal or input winding 42 is coupled to a source 45 of selective signal inputs (Figure 5B) via a rectifier D7, whereby outputs selectively appear at terminal 44 in response to the application of input pulses at terminal 45. The detailed operation of the circuit shown in Figure 4 is discussed in my prior Patent No. 2,709,798, and this discussion will be reviewed briefly to emphasize the improvement of the present invention.

Thus, if we should assume that the core 40 is initially at —B*r* (Figure 1), and if we should further assume that no input pulses are applied to terminal 45, a positive-going power pulse at terminal 43, during the time interval *t*1 to *t*2 (Figure 5) would effect current flow via winding 41, whereby the said core 40 is switched from —B*r* to the point +B*m*. During a next subsequent negative-going power pulse portion, and in the absence of an input at terminal 45, a reverse current flows in winding 41 and resistor R3 to the source $-V_2$. This reverse current flow through winding 41 switches core 40 from +B*m* to —B*m* and thence to —B*r* so that a next subsequent positive-going power pulse again merely switches the core from —B*r* to +B*r*. Thus, in the absence of input pulses at terminal 45, the core 40 is regularly switched from —B*r* to +B*r* and thence back to —B*r*; and inasmuch as each such core switching occurs over an unsaturated portion of the core hysteresis loop, no output appears at terminal 44.

If an input pulse should be applied to terminal 45, during a time interval such as *t*2 to *t*3, in coincidence with a negative-going power pulse from the source 43, this applied input pulse effects current flow through winding 42 whereby the reverting effect of the reverse current flow through winding 41 during this same time interval is opposed. The core 40 thus remains at +B*r* and a next subsequent positive-going power pulse, occuring during the time interval *t*3 to *t*4, drives the core 40 into the region of +B*s* whereby an output occurs at terminal 44.

Subsequent to occurrence of such an output, and in the absence of a further input pulse at terminal 45, the reverting current flow via rectifier D8, winding 41 and resistor R3, must against switch the core to —B*m*; and because of the prior output from the amplifier, this switching must now cause the core to traverse a region from +B*s* to —B*m* in the same time which had been allowed for the power pulse to previously switch the core from —B*m* to +B*m*. The larger flux change which must thus be produced by the reverting source subsequent to an amplifier output thereby effects a larger voltage across winding 41 than was produced by the next preceding positive-going power pulse across the said winding 41. The negative-going portion of the power pulse appearing at terminal 43 during core reversion must therefore again be of sufficient magnitude to assure that rectifier D6 remains disconnected during this latter switching operation; for, in the absence of a negative-going power pulse of this magnitude, incomplete core reversion would again be effected and the next subsequent positive-going power pulse would effect a partial amplifier output even though no input had been applied to the said amplifier.

Thus, in the case of a non-complementing amplifier, it will be seen that the negative-going power pulse amplitude must be of sufficient magnitude to maintain rectifier D6 disconnected during core reversion thereby to permit complete core reversion subsequent to an amplifier output, and this negative-going amplitude is in turn larger than the positive-going pulse amplitude which is required thereafter to switch the core. Once more, therefore, the power pulses employed in conjunction with the non-complementing magnetic amplifier shown in Figure 4, should assume the asymmetrical configuration illustrated in Figure 5A; and the use of such an asymmetrical power pulse avoids spurious outputs and increases the amplifier gain, for the reasons already given.

The particular asymmetrical power pulses discussed in the preceding description may be derived from a pulse source directly generating the desired asymmetrical configuration; or may in turn be effected by symmetrical wave generators in combination with level shifting or biasing devices. Many alternatives in this respect will be suggested to those skilled in the art, and some preferred methods are illustrated in Figures 6 and 7.

Figure 6:
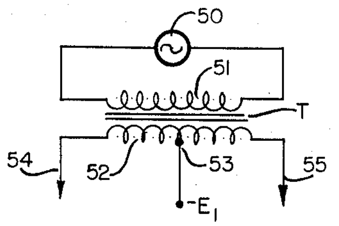
Figure 6 illustrates one possible circuit for effecting asymmetrical amplifier energization in accordance with the present invention.

Thus, referring to Figure 6, it will be seen that one of the simplest methods for achieving asymmetry between the amplifier energizing source and the output therefrom, consists in the utilization of an energizing power pulse source which directly generates the desired asymmetrical waveform configuration. Such a source may comprise a generator 50 producing a symmetrical alternating output having one of the waveform configurations already discussed; and the output of generator 50 may be applied to the primary winding 51 of a transformer T. The secondary winding 52 of the said transformer T may be center tapped at a point 53 and this center tap 53 may in turn be returned to a negative potential $-E_1$. If the amplifier output pulses are referenced to zero or ground potential, a desired train of power pulses having a negative average value may be taken at either end 54 or 55 of the transformer secondary winding 52; and in fact, it will be appreciated that the pulses appearing at ends 54 and 55 will be of opposing phase to one another, whereby such a two-phase source may be employed directly for energizing plural interconnected amplifiers requiring different phases of energization. The negative source $-E_1$ is of course illustrative only and may be replaced by a positive source in those circumstances where the average level of power pulses must be shifted in the opposite direction.

It will be appreciated from the preceding discussion that the advantages of the invention are achieved primarily by producing a relative asymmetry between the energizing power pulses and the amplifier output pulses; and while particular attention has been directed toward amplifiers having output pulses referenced to zero potential whereby the energizing pulses themselves must exhibit either a positive or negative average value, the invention can also be practiced by utilizing symmetrical energization sources coupled to the amplifier power winding, in combination with means shifting the output pulse reference level in an appropriate direction. One simple manner of achieving such a shift in output pulse reference level is to return the amplifier sneak suppressor diode (or clamp circuit) to a desired voltage. One such embodiment is shown in Figure 7, and it will be appreciated that this figure is meant to be generically illustrative of either the complementing amplifier previously described in reference to Figure 2, or of the non-complementing amplifier previously described in reference to Figure 4.

Figure 7:
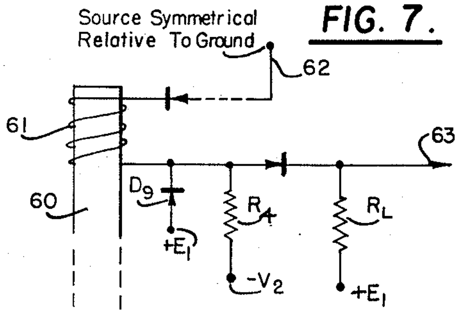
Figure 7 illustrates another possible method of achieving relative asymmetry between an amplifier energizing source and the amplifier output.

Thus, referring to Figure 7, it will be seen that, as has been discussed, the amplifier may comprise a core 60 having a power winding 61 thereon coupled at one of its ends to an energizing source 62; and in the particular example illustrated in Figure 7, this source 62 is symmetrical in nature whereby the positive and negative-going portions of the energizing source are equal in magnitude. The lower end of winding 61 is again coupled to a load $R_L$ whereby an output may be taken at point 63, and the said lower end of winding 61 is, as has been discussed, associated with a sneak suppressor or potential clamp comprising a rectifier D9 and a resistor R4. The anode of rectifier D9, rather than being returned to ground as was the case in Figures 2 and 4, is now returned to a positive voltage $+E_1$; and this arrangement achieves an amplifier output level shift in a direction positive with respect to the average value of the symmetrical energizing source 62, whereby the advantages described previously are effected. In the alternative, when the amplifier is designed to produce a negative-going output signal, the clamp diode equivalent of D9 may be returned to a negative voltage whereby, again, the required relative shift between energizing source and output pulse is achieved.

It should be noted that the particular level shifting arrangements illustrated and described in reference to Figure 7 have certain operational advantages in an overall system utilizing amplifiers for producing positive-going output pulses in combination with other amplifiers for producing negative-going output pulses. In such a composite system, both types of amplifiers can be associated with a common energizing source which may, as has been described, be symmetrical in nature, and the desired asymmetry can then be effected by appropriate shifts in output reference levels. Therefore, those amplifiers which provide positive-going output pulses may have output clamp diodes returned to a small positive voltage, while the amplifiers which provide a negative-going output signal may have output clamp diodes returned to a corresponding negative voltage.

Still other arrangements will be suggested to those skilled in the art; and in particular, it should be noted that the use of relative asymmetry between the amplifier power pulse source and the amplifier output reference level serves to increase the operating efficiency of magnetic amplifiers other than the specific circuits shown heretofore, including amplifiers of both the pulse and carrier types and including two winding, three winding (e. g. input, output, and bias windings), and in fact single winding amplifiers. It must therefore be emphasized that the foregoing description is meant to be illustrative only and should not be considered limitative of my invention, and all such variations as are in accord with the principles described are meant to fall within the scope of the appended claims.

Having thus described my invention, I claim:

1. A magnetic amplifier comprising a core of magnetic material having an input winding and a power winding thereon, means coupling said input winding to a source of input potential, means coupling one end of said power winding to a load, an energizing source of alternating potential having alternately occurring potential excursions of opposite going polarity, means coupling the other end of said power winding to said energizing source of alternating potential, and means for rendering said source asymmetrical with respect to said power winding whereby the effective magnitude of alternate ones of said pulses, applied from said energizing source to said power winding and having a selected pulse polarity, is greater than the effective magnitude of intermediately occurring opposite going ones of said pulses applied by said energizing source to said power winding, the polarity of the average value of said energizing source relative to the reference level of output pulses from said amplifier being opposite to the normal polarity of said output pulses from said amplifier.

2. The amplifier of claim 1 including rectifier means in series with said power winding between said source and sad load, said rectifier means being rendered conductive during each potential excursion of said source having a given polarity, the opposite going excursions of said source being of greater magnitude than the said given polarity excursions thereof.

3. The amplifier of claim 1 including rectifier means in series with said power winding between said source and said load, said rectifier means being rendered conductive during each potential excrusion of said source having a given polarity, said source having a substantially symmetrical alternating output, said means for rendering said source asymmetrical comprising potential level shifting means for shifting the reference potential level of output pulses produced by said given polarity potential excursions of said source to a potential level different from the average output potential level of said source.

4. A magnetic amplifier comprising a core of magnetic material, a winding on said core, an alternating source coupled to said winding, whereby first polarity excursions of said source cause said core to traverse a first hysteretic region thereof when an amplifier output is desired and said first polarity excursions of said source cause said core to traverse a second hysteretic region thereof when no output is desired, and control means coupled to said core and selectively operable during second polarity excursions of said source for selectively switching said core from possible operation in one of said hysteretic regions to possible operation in the other of said hysteretic regions, the amplitude of said second polarity excursions being greater than the amplitude of said first polarity excursions thereby to assure complete switching of said core from one to the other of said hysteretic regions.

5. The amplifier of claim 4 wherein said alternating source is coupled to one end of said winding, and a load coupled to the other end of said winding, said control means comprising a further winding carried by said core.

6. The combination of claim 5 including potential clamp means coupled to said other end of said winding for establishing a reference potential level for said amplifier output.

7. The combination of claim 4 wherein said amplifier comprises a complementing magnetic amplifier.

8. The combination of claim 4 wherein said amplifier comprises a non-complementing magnetic amplifier.

9. A magnetic amplifier comprising a core of magnetic material having an input winding and a power winding thereon, a source of selective input pulses coupled to said input winding, a source of alternating power pulses coupled to said power winding, said power source having first polarity excursions for causing said core to operate in a preselected hysteretic region when outputs are desired, said selective input pulses and second polarity excursions of said power source having amplitudes sufficient to effect switching of said core from saturation in one orientation to the beginning of a saturated region in an opposite orientation of said core, said first polarity excursions of said source being of smaller amplitude than said second polarity excursions, and the amplitude of said first polarity excursions being sufficient to switch said core only from the beginning of said saturated region in said opposite orientation to the beginning of said saturated region in said one orientation.

10. The amplifier of claim 9 wherein said one orientation comprises the positive saturation region of said core, the said power source having negative excursions greater in amplitude than the positive excursions thereof.

11. The amplifier of claim 9 including normally operative reverting means coupled to said core for regularly switching said core through an unsaturated portion of its hysteresis loop, said input pulses being operative to selectively nullify said reverting means whereby said amplifier exhibits non-complementing operation.

12. The combination of claim 9 wherein said amplifier comprises a complementing magnetic amplifier.

13. In a magnetic amplifier having an input and an output, a source of alternating energizing potential coupled to said amplifier, means for applying control signals to said input whereby said source is selectively effective in producing unidirectional output pulses at said output, and means for producing a predetermined potential shift between the average potential level of said alternating source and the output reference potential level of said amplifier output.

14. A magnetic amplifier comprising a core of magnetic material having an input winding and an output winding thereon, a load coupled to one end of said output winding, a source of asymmetrical power pulses coupled to the other end of said output winding, said source having spaced potential excursions of one polarity and of a first amplitude interposed by potential excursions of an opposite polarity and of a second amplitude greater than said first amplitude, and means for selectively applying an input signal to said input winding during selected ones of said opposite polarity power pulse excursions thereby to control the output state of said amplifier.

15. The amplifier of claim 14 including rectifier means in series with said source and said output winding, said rectifier means being conductive to power pulse excursions of said one polarity and being non-conductive to power pulse excursions of said opposite polarity.

16. The amplifier of claim 15 wherein said core comprises a magnetic material exhibiting a substantially rectangular hysteresis loop.

17. The combination of claim 16 wherein said input pulses switch said core from operation in one hysteretic region thereof to operation in another hysteretic region thereof whereby said amplifier exhibits complementing operation.

18. The combination of claim 16 including reverting means coupled to said core for switching said core from operation in one hysteretic region thereof to operation in another hysteretic region thereof, and means responsive to said input pulses for inhibiting operation of said reverting means whereby said amplifier exhibits non-complementing operation.

19. A magnetic amplifier comprising a core of magnetic material having an input winding and a power winding thereon, input means for selectively applying control signals to said input winding, an asymmetrical alternating potential source coupled to one end of said power winding, said source having an average value shifted from ground potential, and means for selectively clamping the other end of said power winding at a reference potential of substantially ground.

20. The combination of claim 19 wherein said amplifier includes means for selectively producing output pulses which are positive-going from said ground reference potential, the average value of said source being negative in polarity.

21. The combination of claim 20 wherein said amplifier includes means for selectively producing output pulses which are negative-going from said ground reference potential, the average value of said source being positive in polarity.

22. The amplifier of claim 19 wherein said input means applies positive-going pulse type signals to said input winding during selected negative-going excursions of said alternating potential source.

23. A magnetic amplifier comprising a power terminal and an output terminal, a source of energizing pulses coupled to said power terminal, said energizing pulses having a given average potential level, said amplifier including means responsive to said energizing pulses for selectively producing spaced output pulses each of which has a unidirectional polarity excursion from a reference output potential level, and means for fixing said reference output potential level at a potential level which is shifted relative to the said given average potential level of said energizing pulses in a direction opposite to that of said unidirectional polarity excursions.

24. The combination of claim 23 wherein said last named means comprises potential clamp means.

25. The combination of claim 24 wherein said clamp means fixes said reference potential output level at substantially ground potential, said source of energizing pulses including means producing an asymmetrical alternating energizing waveform.

26. In a magnetic amplifier system that employs a plurality of magnetic amplifiers connected in cascade so that output pulses from one are applied as input pulses to the next, and a source of alternating potential is used for energizing said amplifiers, the improvement in such a system of each of said magnetic amplifiers comprising a saturable magnetic element, winding means linked to said element, unidirectional means for connecting said source to a terminal of said winding means whereby at least a portion of said winding means tends to be energized by voltage excursions of only one polarity of said alternating potential source to magnetize said element in one direction, output load means connected to a terminal of said winding means for deriving output pulses in accordance with certain pulses of current in said winding means, means for supplying a bias voltage and for combining said bias voltage with the alternating potential of said source to provide opposite going voltage excursions of different effective magnitudes, and means for energizing at least a portion of said winding means to magnetize said element in the opposite direction and to develop a voltage across said winding means during said voltage excursions of the other polarity, which developed voltage is in a direction tending to cause said unidirectional means to conduct and which has a magnitude less than the effective magnitude of said other polarity voltage excursion.

27. In a magnetic amplifier system that employs a plurality of magnetic amplifiers connected in cascade so that output pulses from one are applied as input pulses to the next, and a source of alternating potential is used for energizing said amplifiers, the improvement in such a system of each of said magnetic amplifiers comprising a saturable magnetic element, winding means linked to said element, unidirectional means for connecting said source to a terminal of said winding means whereby said winding means tends to be energized by voltage excursions of only one polarity of said alternating potential source, output load means connected to a terminal of said winding means for deriving output pulses in accordance with certain pulses of current in said winding means, means for supplying a bias voltage of polarity to oppose said one polarity voltage excursions and to aid the opposite polarity voltage excursions, and means for developing a voltage across said winding means during said voltage excursions of the other polarity which developed voltage is in a direction tending to cause said unidirectional means to conduct, the magnitude of said bias voltage being such that the magnitude of said developed voltage is of the order of the net of said one polarity excursions and said bias and less than the net of said opposite polarity excursions and said bias.

No references cited.